United States Patent [19]

Hou et al.

[11] 4,065,775

[45] Dec. 27, 1977

[54] INK JET WITH UNIFORM DENSITY TRACE CONTROL FOR RECORDERS

[75] Inventors: Shou L. Hou, Barrington; Leonard P. Dague, Itasca; Arun K. Agrawal, Elgin, all of Ill.

[73] Assignee: Gould Inc., Rolling Meadows, Ill.

[21] Appl. No.: 639,644

[22] Filed: Dec. 11, 1975

[51] Int. Cl.² ............................................ G01D 15/18
[52] U.S. Cl. ............................. 346/140 R; 346/136
[58] Field of Search ................ 346/146, 75, 29, 136

[56] References Cited

U.S. PATENT DOCUMENTS

| | | | |
|---|---|---|---|
| 3,169,821 | 2/1965 | Miller | 346/140 |
| 3,510,878 | 5/1970 | Johnson | 346/75 X |
| 3,683,212 | 8/1972 | Zoltan | 346/140 X |
| 3,820,121 | 6/1974 | Rich et al. | 346/140 |
| 3,909,831 | 9/1975 | Marchio et al. | 346/140 |
| 3,968,498 | 7/1976 | Uchiyama | 346/29 |

*Primary Examiner*—Joseph W. Hartary

*Attorney, Agent, or Firm*—Leydig, Voit, Osann, Mayer & Holt, Ltd.

[57] ABSTRACT

A chart recorder is disclosed having a variable chart speed and a writing device in the form of a variable droplet rate ink jet pen. The signal pulses for ejecting ink droplets from the pen are generated by a voltage controlled oscillator, and circuits are provided to make the oscillator output frequency proportional to the chart speed, and also responsive to higher rates of pen movement, so that a substantially uniform density line is traced at all chart speeds and virtually all rates of pen movement. To simplify the circuit while maintaining an extremely wide range of writing speeds, the voltage sweep range of the oscillator is set at the upper end of the pen response frequency, and lower oscillator output rates are established by selectable R-C circuit components to match the speed of the chart recorder. To give more precision, a circuit embodiment is also disclosed that generates pen control pulses proportional to the true rate of relative movement between the pen and the chart. The application of the latter circuit to an X-Y recorder is also disclosed.

1 Claim, 5 Drawing Figures

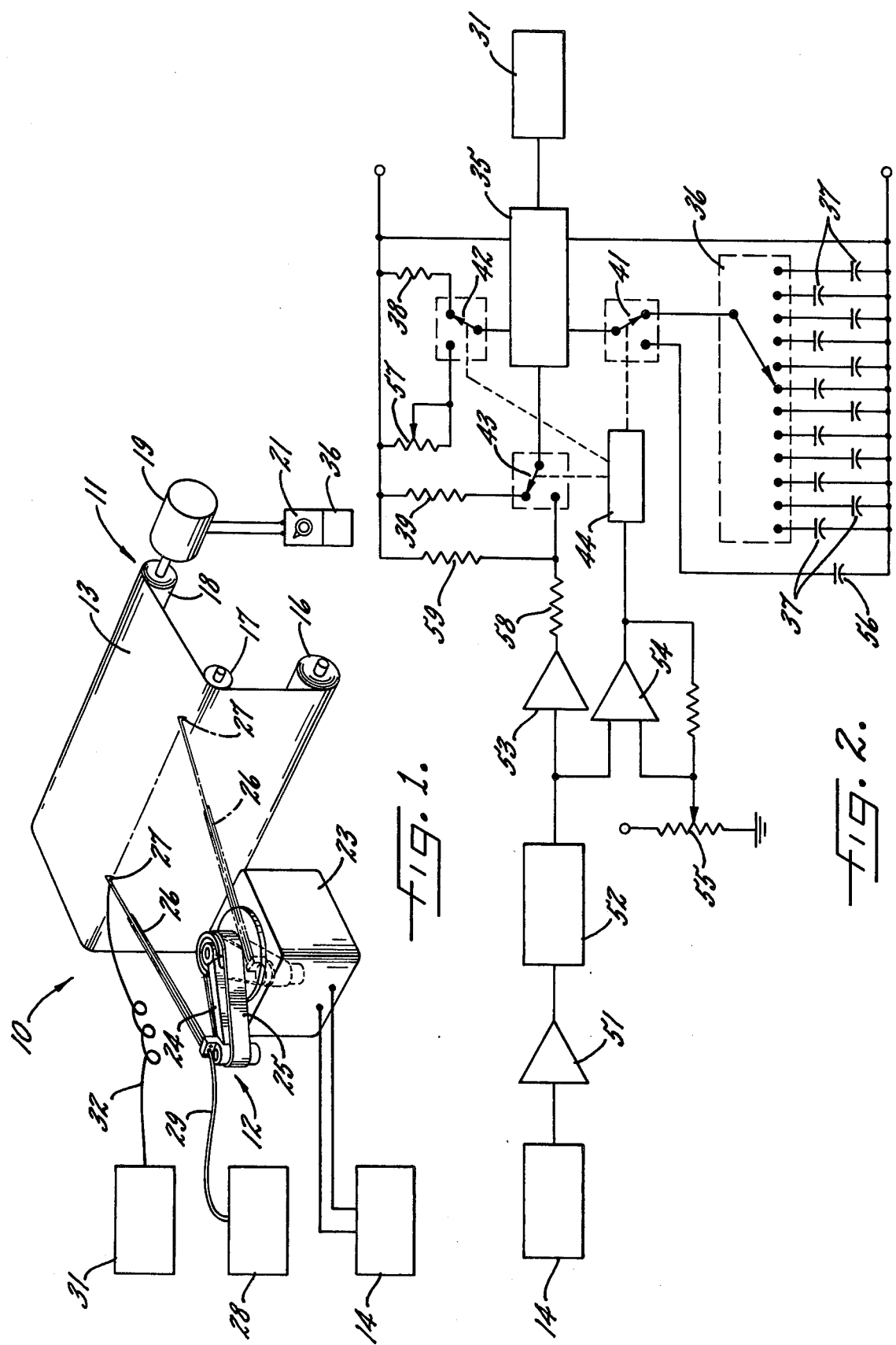

INK JET WITH UNIFORM DENSITY TRACE CONTROL FOR RECORDERS

This invention relates generally to ink jet writing devices and more particularly concerns a control system for variable droplet rate ink jet devices.

Non-contact writing devices which produce traces by propelling droplets of ink against the medium being printed upon are well known as ink jets to the art. One class of such devices is the impulse or command ink jet in which ink droplets are ejected upon receipt of an electrical signal or at a rate dictated by a signal frequency. Devices of this kind are disclosed and claimed in U.S. Pat. No. 3,683,212, issued Aug. 8, 1972, its related divisional U.S. Pat. Nos. 3,840,758, 3,857,049 and 3,902,083, and U.S. Pat. No. 3,832,579, issued Feb. 7, 1973.

Other types or classes of ink jets are also capable of having their droplet generating rate controlled, and therefore the term variable droplet rate ink jet has been occasionally used herein to insure that the intent to state a generic class is clear.

A potentially important characteristic of such impulse ink jets is their wide range of droplet generating speeds. Devices of the kind disclosed in the above-identified patents can generate ink droplets at rates varying from zero to approximately 10,000 per second. What this means in a practical case can be seen by considering an ink jet applied as the writing pen of a modern recorder having a range of chart speeds from 6 inches per hour to 5 inches per second. An ink jet with a droplet forming orifice of 2 mils diameter will make a neat, narrow, legible line if droplets are applied to the writing surface at a 200 droplet per linear inch rate. That writing rate can be maintained through the full range of chart speeds discussed by generating droplets at a rate of from one droplet per 3 seconds, for a 6 inches per hour chart speed, up to a rate of 1,000 droplets per second for the highest chart speed of 5 inches per second.

It is the primary aim of the invention to utilize the ability of variable droplet rate ink jets to generate ink droplets at widely varying rates by controlling droplet generation as a function of the relative speed between the jet and the medium being written upon so as to provide a uniform writing device having an extremely wide range of writing speeds.

Referring again to the recorder application, it will be apparent that required writing speed is not only dictated by chart speed, but also by the reaction rate of the pen motor. The recording of a square wave signal, for example, obviously calls for high writing speed even at slow chart speeds.

It is therefore another object of the invention to provide a control system for an impulse ink jet that is responsive to both movement of the jet device as well as movement of the medium being written upon so as to maintain a droplet generation rate closely associated with the writing speed required of the device. A related object is to provide a control system for an X-Y recorder in which, instead of chart paper movement, the pen moves variably along two right angled paths and the system maintains droplet generation closely related to the resulting writing speed.

A further object is to provide a system as characterized above which is relatively straightforward and economical to manufacture and maintain, making it well suited for wide range chart type recorders.

Other objects and advantages of the invention will be apparent upon reading the following detailed description and upon reference to the drawings, in which:

FIG. 1 is a fragmentary perspective, partially schematic, of a recorder embodying the invention;

FIG. 2 is a schematic diagram of the circuit used with the recorder of FIG. 1;

Figure 3:
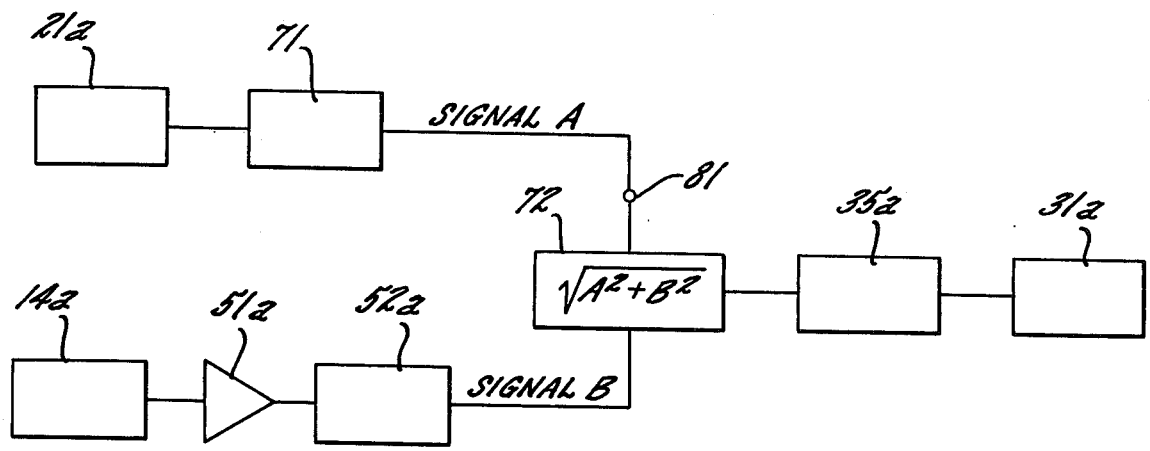
FIG. 3 is a block schematic diagram of a second control circuit embodying the invention.

While the invention will be described in connection with certain preferred embodiments, it will be understood that we do not intend to limit that invention to those embodiments. On the contrary, we intend to cover all alternatives, modifications and equivalents as may be included within the spirit and scope of the invention as defined by the appended claims.

Turning now to the drawings, there is shown a recorder 10 including a chart assembly 11 and a pen assembly 12 intended, as is conventional, to trace on chart paper 13 a line whose amplitude across the chart paper is proportional to the amplitude of the signal from a source 14 that is being recorded. The chart assembly 11 includes a paper supply roll 16, a platen roll 17 and a take-up roll 18 driven by a variable speed motor 19. A selector switch 21 controls the speed of the motor 19 and hence the rate at which the chart paper 13 is drawn past the pen assembly 12. Typically, a modern recording device has a speed range of from six inches per hour to five inches per second.

The pen assembly 12 is preferably the type shown in U.S. Pat. No. 3,088,788, issued May 7, 1963, and it includes a pen motor 23 which oscillates a lever 24 and a belt 25, which together control the movement and position of an arm 26. The writing element of the assembly 12 is an impulse ink jet 27 mounted on the tip of the arm 26 and being of the kind shown in U.S. Pat. No. 3,683,212, issued Aug. 8, 1972. Ink is supplied to the ink jet 27 from a reservoir 28 through a capillary conduit 29, and ink droplets are expelled from the jet 27 onto the chart pape 13 in response to electrical signals conveyed from a pen driver 31 by electrical leads 32. An ink jet of the kind under construction has a droplet generating frequency range of from zero, i.e., no ink being expelled at all, up to a droplet generating rate of approximately 10,000 per second.

As observed above, an ink jet having a droplet forming orifice 2 mils in diameter will make a desirable trace line at a 200 droplet per linear inch rate. Considering the ink jet 27 to be of that size, and taking a practical recorder embodiment, the switch 21 provides 12 selectable chart speeds and, to maintain a 200 droplet per inch line, the following droplet rates are required for the respective chart speeds:

| Chart Speed | Droplet Frequency |
|---|---|
| 5 inches per second | 1,000 Hz. |
| 2 inches per second | 400 Hz. |
| 1 inch per second | 200 Hz. |
| 0.5 inches per second | 100 Hz. |
| 0.2 inches per second | 40 Hz. |
| 0.1 inch per second | 20 Hz. |
| 5 inches per minute | 17 Hz. |
| 2 inches per minute | 6.7 Hz. |

-continued

| Chart Speed | Droplet Frequency |
|---|---|
| 1 inch per minute | 3.4 Hz. |
| 0.5 inches per minute | 1.7 Hz. |
| 0.2 inches per minute | 0.67 Hz. |
| 0.1 inch per minute (6 inches per hour) | 0.33 Hz. |

These relationships provide one set of requirements for control of the recorder 10, but it will be apparent that the above relationships hold only when there is no pen movement in response to signals from the source 14. It will also be apparent that the nominal 200 droplet per inch rate is only representative and, for whatever reason, a differing rate can be adopted with obvious changes being made in the frequencies of the table above.

In accordance with the invention, a control circuit couples the chart speed switch 21, recorder signal source 14, and ink jet pen driver 31, so as to maintain a rate of ink droplet generation that is substantially proportional to the rate of relative movement between the pen and the chart paper 13 — whether that movement is the result of chart speed or rate of change of the signal being recorded. The control circuit includes a variable rate, controllable oscillator 35 which has its output connected to the pen driver 31, and the oscillator output is controlled both by a switch 36 ganged with the chart speed switch 21 and by a signal representing the slope or absolute differentiated value of the signal from the source 14.

Preferably, the oscillator 35 is a voltage controlled oscillator of the kind readily available as an integrated circuit having a pulse or square wave output whose frequency is determined by a control voltage and external resistance-capacitance elements, and which will provide a linearly modulated output frequency within a sweep range in response to a varying control voltage. In the present state of the art, economical ones of such oscillators have an extremely wide range of possible output frequencies, 8 or 9 orders of magnitude being readily attainable, but they are somewhat limited in the voltage controlled sweep range, a 1000 to 1 range being typical. To make the best use of the ink jet 27, a 5 order of magnitude range is desirable so as to go from a rate of 1 droplet of ink every 3 seconds, the requirement for 200 drops per linear inch at the slowest chart speed, up to approximately 10,000 drop per second which is the approximate maximum droplet generating rate of the device 27.

Pursuant to the invention, the circuit obtains a 5 order of magnitude frequency range from a single voltage controlled oscillator by switching from fixed, chart speed dependent, lower frequencies to a voltage controlled sweep range set to reach the approximate maximum output rate of the ink jet. In the preferred circuit, the switch 36 connects one of twelve capacitors 37 in the circuit depending upon the chart speed selected by the setting of the switch 21, and a resistance 38 and a control current established by a resistance 39 are all connected to the oscillator 35 through the respective normally closed contacts 41, 42 and 43 of an electronic switch 44. The values of the capacitors 37 are selected in view of the resistance 38 and the voltage at the contacts 43 so as to produce oscillator output square wave pulses at frequencies set forth in the above table for the respective ones of the twelve available chart speeds.

Signals from the source 14 are, in addition to being directed to the pen motor 23, fed to a differentiating amplifier 51 whose output, through an absolute value circuit 52, is converted to a voltage signal proportional to the rate of movement demanded of the pen 27. That signal is directed both to an amplifier 53 with a cascaded resistive divider 58, 59, which amplifies and shifts the voltage level to a signal compatible with voltage control of the oscillator 35, while maintaining proportionality, and to a settable, voltage responsive switch in the form of a Schmitt trigger 54. A variable resistance 55 permits setting of the threshold voltage of the Schmitt trigger 54 so as to energize the switch 44.

When the switch 44 is energized, contacts 41 and 42 shift their illustrated positions to couple an alternate capacitor 56 and an alternate resistor 57 to the oscillator 35, and contacts 43 shift to couple the output of the level shifter 53 to the voltage control pin of the oscillator 35. This allows the oscillator output to be modulated by the absolute value of the differentiated signal from the source 14 through the sweep range of the oscillator, and the resistance 57 is variable so as to permit the setting of the sweep range frequencies. Considering the oscillator 35 to have the 1000 to 1 sweep range discussed above, it is desirable to set the range so that the oscillator responds with a maximum frequency of 9,000 Hz. down through 9 Hz., thus giving modulated control of the ink drop generating frequency from approximately the top of the ink jet's capability of responding down through the full range of the oscillator's sweep range.

Operation of the recorder 10 and its FIG. 2 control circuit will be readily apparent from the above discussion. When there is a substantially constant signal, or the absence of a signal, from the source 14 the rate at which ink droplets are applied to the chart paper 13 is determined by the speed of the chart paper moving past the pen assembly 12. The switch 36, associated with the chart speed selector 21, couples the oscillator 35 to resistance-capacitance elements selected to produce the proper ink droplet generating frequency for the associated chart speed. Slow to moderate variations of the signal emanating from the source 14 continue to allow chart speed to control the rate of ink drop generation, and those skilled in the art will appreciate that few other recorder writing devices have the capability of maintaining a neat uniform line through the wide range of chart speeds contemplated in this application.

When there are rapid changes in the signal from the source 14, a signal voltage proportional to that rate of change appears at the Schmitt trigger 54 and, when the set threshold is exceeded, the switch 44 is energized so that ink droplet generation is thereafter modulated, preferably up to about the top response capability of the ink jet, by a signal proportional to the rate at which the pen motor 23 is driving the ink jet 27. This maintains a neat, uniform trace line even when sharply varying signals are being recorded.

It will be appreciated that the circuit of FIG. 2 gives a droplet generation rate proportional to the then-controlling speed of either the chart or the pen. In accordance with a further aspect of the invention, the control circuit can be modified as shown in FIG. 3 to generate ink droplets at a rate proportional to the true rate of movement of the pen relative to the chart paper considering the two directions of pen-chart paper movement. Stated another way, the ink droplets are generated in proportion to the vector sum of the two directions of relative pen-paper movement.

In the circuit of FIG. 3, parts corresponding to those previously described have been given the same reference numbers with the distinguishing suffix *a* added. Thus, a source 14*a* which generates the signal to be recorded is coupled to a differentiating amplifier 51*a* whose output, through an absolute value circuit 52*a*, is converted to a voltage signal B proportional to the rate of movement of the pen along a path substantially at right angles to the direction of chart paper movement. A chart speed switch 21*a* is coupled to a circuit 71 whose output is a voltage signal A proportional to the rate of movement of the chart paper.

The signals A and B thus represent rates of relative pen-paper movement along paths substantially at right angles to one another. In the illustrated embodiment, a logic circuit 72 squares, adds and takes the square root of the signals A and B, directing the resulting signal — now proportional to the vector sum of pen-chart paper movement — to a voltage controlled oscillator 35*a* which delivers a pulse or square wave output to an ink jet pen driver 31*a* at a frequency determined by the voltage from the circuit 72.

Those familiar with computational circuitry will appreciate that a number of other techniques can be readily devised for accomplishing the purposes of the FIG. 3 circuit. For example, if signals A and B are *a-c*. signals, passing one of the signals through a simple 90° phase shift circuit before they are summed will produce a signal proportional to the desired vector.

Figure 4:
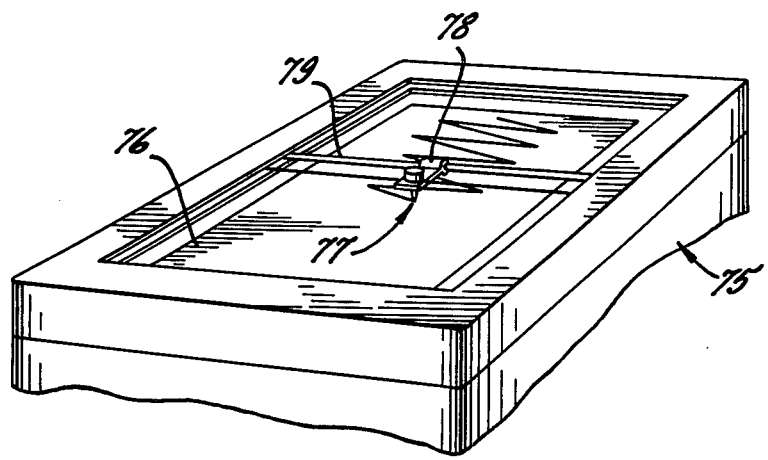
FIG. 4 is a fragmentary perspective of an X-Y recorder embodying the invention.

The invention is also well suited for use with an X-Y recorder such as the recorder 75, see FIG. 4, in which paper 76 is secured on a plotting table and an ink jet pen 77 is mounted on a head 78 that travels along a bar 79. As is conventional with such recorders, a pair of signal responsive motors (not shown) respectively drive the head 78 along the bar 79, and the bar 79 over the plotting table, the two paths of movement being at right angles and comprising the X and Y axes of the recorder. The true rate of relative movement of the ink jet pen 77 over the paper 76 is therefore the vector sum of the rates of movement of the head 78 along the bar 79, and the bar 79 over the paper.

Figure 5:
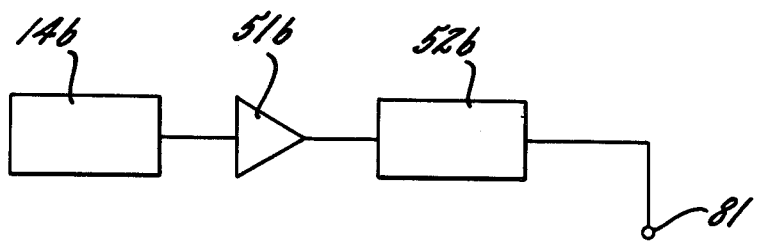
FIG. 5 is a fragmentary block schematic showing a second embodiment of the circuit shown in FIG. 3.

As an aspect of the invention, a constant density line can be obtained in the recorder 75 by using the pen driver 31*a* as controlled by circuit of FIG. 3 slightly modified in the manner shown by FIG. 5. The source 14*a* is used to drive the motor for one of the axes of the recorder 75, and a second source 14*b* is connected to drive the motor for the other one of the axes of the recorder 75. The signal from the source 14*b* is coupled to a differentiating amplifier 51*b* whose output, through an absolute value circuit 52*b*, is converted to a voltage signal at a value circuit 52*b*, is converted to a voltage signal at a terminal 81 that is proportional to the rate of movement of the pen 77 along the axis controlled by the signal source 14*b*. For controlling the pen 77 in the recorder 75, the circuit elements 21*a* and 71 are replaced by the circuit elements 14*b*, 51*b* and 52*b*, and the circuit functions as previously described; it being noted that parts corresponding to those already described have been given the same reference numbers with distinguishing letter suffixes.

It can now be seen that the invention provides for the control of an ink jet pen in a recorder in a manner that produces a trace line of uniform density despite wide variations in relative movement between the pen and the paper being written upon. In the case of the FIG. 2 circuit, an extremely wide range of relative pen-chart paper speeds is readily accommodated although the proportionality between pen-paper movement and the droplet generating rate is approximated. In the FIG. 3 circuit, the ink droplet rate is made proportional to the true relative rate of movement between the pen and the chart paper, and by minor adaptation of this circuit, suggested in FIG. 5, the control system becomes well suited for a table top graphic recorder application such as an X-Y recorder.

Those skilled in this art will also understand that the electrical or electronic elements of the various control circuit embodiments are relatively straightforward and economical to manufacture and maintain.

We claim as our invention:

1. In a recorder having a variable speed chart paper drive, a pen motor having a response rate proportional to the signal being recorded, and a variable droplet rate ink jet pen which delivers ink droplets to the chart paper at a rate corresponding to a pen drive frequency, a control system comprising, in combination, a variable rate oscillator for delivering a pen drive signal to said pen through a frequency range from zero to approximately the highest response rate of said pen, a control for setting the speed of said chart paper drive, means responsive to the setting of said control for causing said oscillator to deliver a pen drive signal frequency proportional to movement of the chart paper so that, without pen movement, a uniform line is created by the pen through all chart speeds, means for differentiating said signal being recorded and developing an oscillator sweep controlling signal proportional to the rate of pen movement, and means including a switch for coupling said sweep controlling signal to said oscillator when a predetermined pen movement rate is exceeded so as to thereafter vary the oscillator signal frequency in proportion to the rate of pen movement.

* * * * *